United States Patent [19]
Kim

[11] 3,802,843
[45] Apr. 9, 1974

[54] FLUID TESTING APPARATUS

[75] Inventor: Jae Chang Kim, Peekskill, N.Y.

[73] Assignee: American Hospital Supply Corporation, Evanston, Ill.

[22] Filed: May 28, 1971

[21] Appl. No.: 147,955

[52] U.S. Cl. ............... 23/259, 23/230 B, 23/253 R, 23/292
[51] Int. Cl. .............................................. G01n 1/14
[58] Field of Search........... 23/230 B, 259, 292, 253

[56] References Cited
UNITED STATES PATENTS

| | | | |
|---|---|---|---|
| 3,451,777 | 6/1969 | DiGiulio | 23/230 B |
| 3,493,503 | 2/1970 | Mass | 23/230 B |
| 3,615,235 | 10/1971 | Hrdina | 23/230 B |

*Primary Examiner*—Morris O. Wolk
*Assistant Examiner*—R. E. Serwin
*Attorney, Agent, or Firm*—Dawson, Tilton, Fallon & Lungmus

[57] ABSTRACT

A fluid testing apparatus which is particularly suitable for isotope testing of human serum includes an elongated cylindrical tube having a closed lower end which telescopingly receives an elongated plunger. The plunger includes a generally cylindrical lower end which is relatively snugly received by the tube and a central portion having a transverse cross sectional area which is less than the cross sectional area of the tube interior so that fluid can flow in the space between the central portion of the plunger and the tube. The end portion of the plunger includes a cylindrical side wall and a transverse top wall which is provided with a central opening for communicating the bottom end of the plunger with the flow area between the central portion of the plunger and the tube. A mesh screen is held against the top wall of the end portion in covering relation with the central opening by an annular plug which is frictionally retained within the end portion, the central opening of the plug being aligned with the opening through the top wall.

13 Claims, 7 Drawing Figures

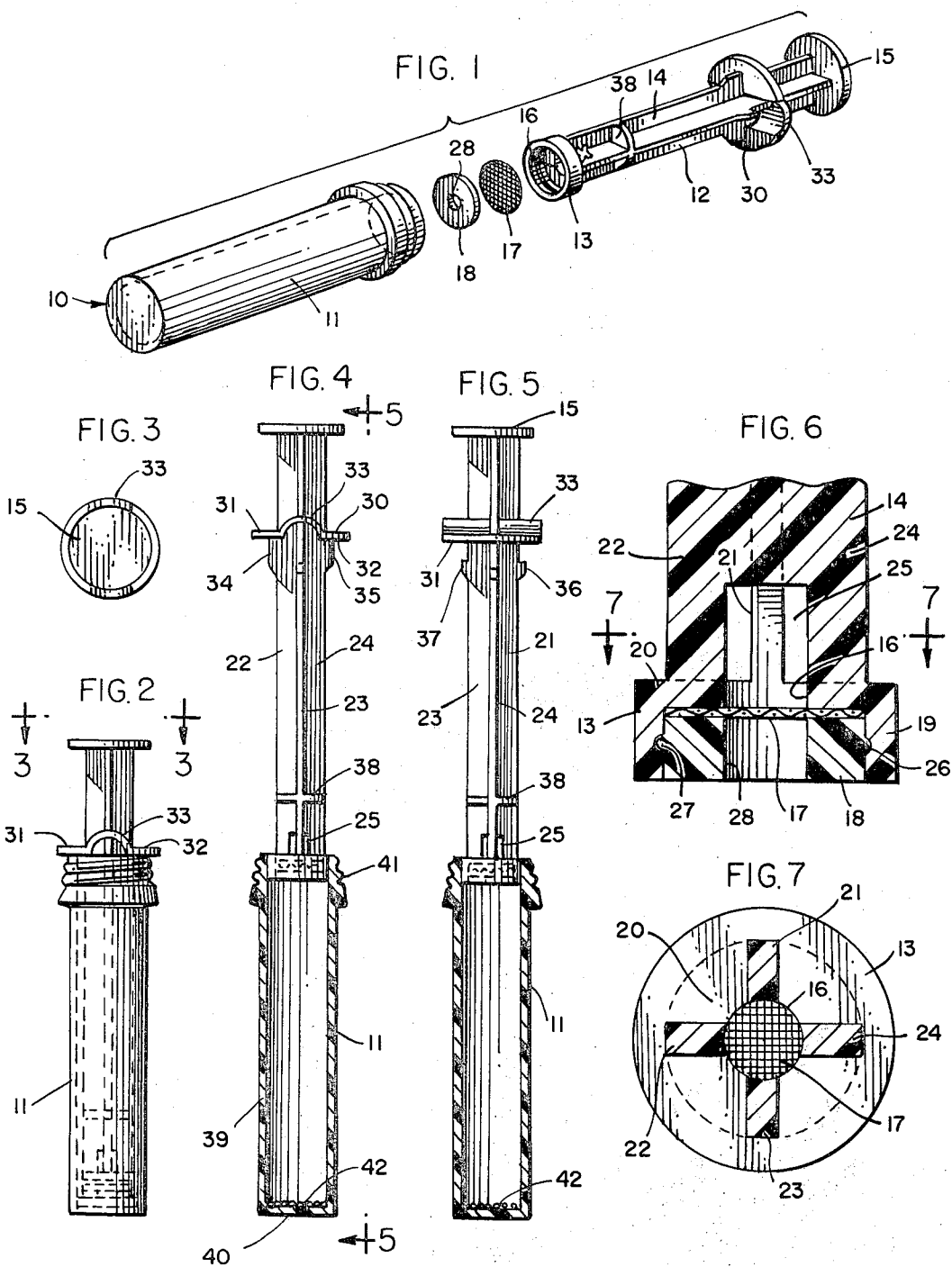

FLUID TESTING APPARATUS

BACKGROUND

This invention relates to a testing apparatus in which particles must be contacted with test fluids and other liquids, and, more particularly, to an apparatus particularly suitable for use in isotope testing in which a competitive binding is established between resin particles and a carrier protein in human serum.

The competitive protein binding method for quantitative determinations of certain components of blood is well known. This method is particularly useful in the in vitro testing of thyroid conditions. Thyroxine is thought to be the main physiologically active hormone produced by the thyroid gland, and greater than 99% of thyroxine circulates in the plasma bound to serum proteins. Certain ion-exchange resins also have the ability to bind the thyroid hormones, and the degree to which thyroid hormones become bound to these resins can be a measure of the thyroid hormone content of the blood.

A common method of determining the thyroxine content of blood is the T-3 uptake resin absorbent method, which is explained in detail in "Thyroid Disease: PBI, T4, Free Thyroxin or T3 Manual," Check Sample CC-47, by Donald L. Bittner, M.D., published by the Commission on Continuing Education of the Council on Clinical Chemistry in 1968. The method essentially involves adding the serum to be tested to a tube containing a suitable ion-exchange resin and radioactive triiodothyronine, commonly called T-3. The mixture is allowed to incubate for a time during which the radioactive T-3 becomes bound to the available protein binding sites of the serum and to the resin. The fluid is then poured off, the particles are carefully rinsed, and the radioactivity of the resin is measured. The radioactivity of the resin, or the T-3 uptake, is determined, and this T-3 uptake is an indirect measure of the thyroxine present in the serum.

SUMMARY

The invention provides an improved apparatus for performing the T-3 resin uptake test, as well as other tests which utilize particles and competitive binding. The T-3, serum, and resin beads can be added to the tube, which is provided with an externally threaded upper end to permit the tube to be capped while the mixture is incubated. Thereafter, the plunger is inserted into the tube, and the liquid is poured off. The resin beads are retained within the tube, however, by the mesh screen which covers the fluid passage in the lower end of the plunger. The resin beads are washed of the T-3 and the serum by pouring water into the tube and reciprocating the plunger. Water is forced through the central opening in the bottom of the plunger as the plunger is reciprocated, and good agitation and washing action is obtained. Finally, the rinse water is poured off, and the radioactivity of the tube contents is measured. The upper end of the plunger is provided with a convenient pouring spout to facilitate the pouring of the liquid and safeguard against spilling or dripping of the liquid, which should be treated as radioactive material.

DESCRIPTION OF THE DRAWING

The invention will be explained in conjunction with an illustrative embodiment shown in the accompanying drawing, in which FIG. 1 is an exploded perspective view of the apparatus;

FIG. 2 is an elevational view of the apparatus with the plunger fully inserted in the tube;

FIG. 3 is a top plan view of FIG. 2 taken along the line 3—3;

FIG. 4 is an elevational view similar to FIG. 2 with the plunger almost fully retracted from the tube;

FIG. 5 is an elevational view similar to FIG. 4 taken along the line 5—5 of FIG. 4;

FIG. 6 is an enlarged fragmentary sectional view of the bottom portion of the plunger; and FIG. 7 is a sectional view taken along the line 7—7 of FIG. 6.

DESCRIPTION OF SPECIFIC EMBODIMENT

Referring to FIG. 1, the testing apparatus 10 includes an elongated generally cylindrical tube or vial 11 and an elongated plunger 12 which can be telescopingly received in the tube. The plunger 12 includes a generally cylindrical bottom end portion 13, a central portion 14 formed of a plurality of longitudinally extending intersecting ribs, and a disc-like top 15. A central opening 16 is provided through the bottom end of the plunger, and a circular mesh screen 17 is retained in covering relationship with the opening by an annular plug 18.

Referring now to the more detailed views of FIGS. 6 and 7, the end portion includes a longitudinally extending cylindrical side wall 19 and a transversely extending top wall 20 through which the central opening 16 is provided. The central portion 14 comprises four elongated ribs 21, 22, 23 and 24 which extend radially outwardly from the longitudinal axis of the plunger and which are joined to the top wall 20. Each of the ribs 21-24 is provided with a notch 25 above the central opening 16 to facilitate the flow of fluid through the opening, each notch extending radially outwardly to the periphery of the opening 16.

The inner surface of the cylindrical side wall 19 is provided with a circumferentially extending groove 26 for cooperation with a correspondingly shaped circumferentially extending ridge 27 on the plug 18. The screen 17 is retained in place in covering relation with the central opening 16 by inserting the annular plug into the recess provided by the cylindrical end portion until the ridge is received in the groove. The screen permits fluid to flow through the opening 28 of the annular plug and the opening 16 but prevents the passage of particles having a mesh size larger than that of the screen.

The upper portion of the plunger includes a cap portion 30 comprising a pair of substantially semicircular planar portions 31 and 32 which are joined by a central arcuate spout portion 33. Planar portions 31 and 32 extend radially outwardly beyond the wall of the tube 11 and are spaced from the lower end of the plunger to provide a positive stop against further telescoping movement when the bottom of the plunger is spaced slightly above the bottom of the tube (FIG. 2). In this position, the planar portions of the cap portion seat against the upper end of the tube, and the arcuate spout portion 33 serves to permit pouring of fluid from the tube in a relatively confined stream.

The cylindrical end portion 13 of the plunger has an outside diameter slightly less than the inside diameter of the tube to permit the end portion to be relatively snugly received in the tube and to prevent the passage of the ion-exchange resin beads or other test particles between the end portion and the tube. The ribs 21–24 which form the central portion of the plunger terminate radially inwardly from the periphery of the end portion along substantially their entire length to permit substantially free fluid flow between the quadrants provided by the ribs. Referring particularly to FIG. 4, the ribs 22 and 24, which join with the planar portions 31 and 32, respectively, of the cap portion, project radially outwardly at 34 and 35 to a radius approximately the same as the radius of the cylindrical end portion. The ribs 21 and 23 also extend radially outwardly at 36 and 37, but these radial enlargements terminate below the cap portion to permit free fluid flow through the spout from both sides of the ribs 21 and 23. When the plunger is fully inserted into the tube, the radially enlarged rib portions 34–36 are also relatively snugly received in the tube and cooperate with the end portion to align the plunger coaxially with the tube. If desired, the ribs may be reinforced intermediate the end portion 13 and the cap portion 30 by transversely extending reinforcing sectors portions 38.

The tube 11 includes a generally cylindrical side wall 39 having an open upper end and a bottom wall 40 which closes the bottom of the tube. The upper end of the tube is externally threaded at 41 to permit the tube to be capped when the plunger is removed.

The use of the apparatus will be explained in conjunction with the T-3 resin uptake test for thyroxine, but it will be understood that the apparatus can be used in other types of tests. A predetermined amount of T-3 working solution is added to a tube 11, and a count of the radioactivity is taken. Measured amounts of a serum to be tested and a control reagent are then added to the tube along with ion-exchange resin beads 42 (FIGS. 1–5). An internally threaded closure cap is secured to the tube by means of the threads 41, and the liquid and resin is allowed to incubate at room temperature for a predetermined time period, for example, 1 hour, while the tube is subjected to a gentle tumbling action by a conventional tube rotator.

The closure cap is then removed, and the plunger is inserted all the way into the tube. As the plunger is lowered, the liquid passes upwardly through the aligned openings 28 and 16 in the annular plug and the bottom of the plunger, but the resin beads are retained below the plunger by the screen 17. The tube is then inclined to pour off the liquid through the spout 33, and the liquid is discarded as radioactive material.

Thereafter, water is added to fill the tube about three-fourths full, and the plunger may be retracted upwardly somewhat to facilitate the addition of the water. The resin and the interior of the tube is then washed by reciprocating the plunger several times, the plunger being grasped by the top disc 15. As the plunger moves upwardly, water flows downwardly through the openings 16 and 28, and as the plunger moves downwardly, the water is forced upwardly through the openings. On the last stroke, the plunger is pushed to the full downward position in which the closure portions 31 and 32 engage the top of the tube, and the liquid is again poured off through the spout and discarded as radioactive material. This washing procedure is repeated several times to completely wash the resin.

After the final washing the plunger is retained in the tube, and a second radioactive count is taken. The percentage of the T-3 uptake of the resin is calculated according to the following equation:

$$\text{2nd count per minute} / \text{1st count per minute} \times 100 = \% \text{ T-3 uptake}$$

A T-3 resin uptake of about 25 percent to about 35 percent generally indicates a euthyroid condition, an uptake of more than 35 percent generally indicates a hyperthyroid condition, and an uptake of less than 25 percent generally indicates a hypothyroid condition.

The particular plunger described and illustrated includes a central portion having four intersecting ribs to permit substantially free fluid flow between the central portion of the plunger and the tube. However, the plunger can have other cross-sectional configurations which would permit fluid flow in the area between the plunger and the tube so long as the cross-sectional area of the central portion of the plunger is less than the cross-sectional area of the bore of the tube.

In one particular embodiment of the invention the tube 11 was 2.750 inches long and had an outer diameter of 0.580 inch and an inside diameter of 0.500 inch. The distance from the upper end of the tube to the bottom wall was about 2.70 inches. The plunger had a total length of 3.54 inches, and the distance between the bottom end of the plunger and the planar portions 31 and 32 of the cap portion was about 2.624 inches. The cylindrical end portion 13 had an outer diameter of 0.125 inches. The length of the openings 16 and 18 had a diameter of 0.125 inches. The length of the opening 16 from the bottom of the wall 20 to the upper end of the notches 25 was 0.187 inch. The ribs 21–24 were 0.05 inch thick, and the opposite sides of the corresponding rib pairs 22 and 24, and 21 and 23 were 0.375 inches apart. The corresponding pairs of radially enlarged rib portions 35 and 35, and 36 and 37 were spaced 0.490 inches apart. The screen 17, groove 26, and ridge 27 were sized and arranged to hold the screen relatively snugly against the wall 20 of the plunger when the ridge was snapped into place in the groove 26, and the bottom of the plug was also substantially flush with the bottom of the plunger. The mesh size of the screen was selected to prevent the passage of the smallest resin beads to be used.

The construction of the plunger not only promotes effective mixing and rinsing action, but also insures that none of the extremely small resin particles will be lost as the liquids are poured from the tube or as the plunger is vigorously reciprocated to intimately mix the particles or beads with such liquids. In a procedure such as a T-3 uptake test, it is imperative that none of the resin beads escape during the fluid contacting or washing steps. Should any such beads be lost — a real danger in the use of prior devices — the accuracy of the test results would be adversely affected, quite conceivably leading to an incorrect diagnosis of a patient's condition.

While in the foregoing specification, a detailed description of a specific embodiment of the invention was set forth for the purposes of illustration, it is to be understood that many of the details herein given may be varied considerably by those skilled in the art without departing from the spirit and scope of the invention.

I claim:

1. An apparatus for testing fluids comprising an elongated tube having a generally cylindrical side wall defining a longitudinally extending bore, an imperforate bottom wall closing the bore, and an open top, an elongated plunger telescopingly received in the tube, the plunger including an elongated central portion and a generally cylindrical end portion, the central portion having a transverse cross-sectional area less than the transverse cross-sectional area of the tube bore to provide a longitudinally extending flow passage between the central portion and the side wall of the tube, the end portion of the plunger slidably engaging the cylindrical wall of the tube within said bore and having a longitudinally extending opening therethrough communicating with both the portion of the tube bore below the plunger end portion and with the flow passage between the tube side wall and the plunger central portion, and screen means positioned adjacent the opening for permitting the reverse flow of fluid through the opening as the plunger is lowered but screening particles exceeding a predetermined size from passing upwardly through said opening.

2. The apparatus of claim 1 in which the plunger includes a cap portion extending transversely outwardly from the central portion for engagement with the upper end of the side wall of the tube, the cap portion including spout means whereby fluid can be poured from the tube through the spout means when the cap portion engages the upper end of the side wall.

3. The apparatus of claim 2 in which the cap portion includes a transversely extending generally planar closure portion engageable with the upper end of the side wall and a spout portion extending upwardly from the planar portion whereby the spout portion is spaced from the upper end of the side wall when the closure portion engages the side wall.

4. The apparatus of claim 1 in which the central portion of the plunger includes a plurality of ribs extending radially outwardly from the longitudinal axis of the plunger, the opening through the end portion extending along the longitudinal axis of the plunger.

5. The apparatus of claim 4 in which the radius of the ribs is less than the inner radius of the tube along most of the length of the ribs, the ribs projecting radially outwardly adjacent the upper end of the plunger to a radius substantially the same as the radius of the end portion whereby the plunger is maintained in substantial coaxial alignment with the tube when the end portion and the outwardly projecting rib portions are positioned within the tube.

6. The apparatus of claim 1 in which the end portion is provided with a recessed lower end, the screen means comprising a mesh screen received in the recess, a plug received in the recess and retaining the screen therein, the plug having a central opening therethrough communicating with the opening in the end portion.

7. The apparatus of claim 1 in which the end portion includes a generally cylindrical side wall and a top wall defining a generally cylindrical recess, the opening through the end portion being provided through the top wall along the axis of the plunger, the screen means comprising a generally planar mesh screen received by the recess and positioned below the opening, an annular plug received by the recess and frictionally retained therein, the plug retaining the screen adjacent the top wall of the end portion.

8. The apparatus of claim 7 in which the annular plug includes a longitudinally extending generally cylindrical side wall having a radially outwardly extending perimetric rib received in a circumferentially extending groove in the inner surface of the side wall of the end portion whereby the plug is removably secured within the recess.

9. The apparatus of claim 1 in which the upper end of the side wall of the tube is externally threaded and is adapted to be threadedly engaged with an end cap when the plunger is withdrawn from the tube.

10. An apparatus for testing fluids comprising an elongated tube having a generally cylindrical side wall defining a longitudinally extending bore, a bottom wall closing the bore, and an open top, an elongated plunger telescopingly received in the tube, the plunger including an end portion, a cap portion and a central portion between the end and the cap portions, the central portion including a plurality of ribs extending radially outwardly from the longitudinal axis of the plunger, the end portion including a generally cylindrical side wall and a transversely extending top wall defining a generally cylindrical recess, the side wall of the end portion having an outer diameter slightly less than the inner diameter of the tube and the top wall having a central opening therethrough, a generally planar mesh screen received by the recess and positioned below the opening, an annular plug received by the recess and frictionally retained therein, the plug retaining the screen adjacent the top wall of the end portion and having a central opening therethrough aligned with the opening in the top wall, the cap portion of the plunger including a transversely extending planar portion engageable with the upper end of the side wall of the tube and a spout portion extending upwardly from the planar portion whereby the spout portion is spaced from the upper end of the side wall when the closure portion engages the side wall.

11. The apparatus of claim 10 in which the radius of the ribs is less than the inner radius of the tube along a portion of the length of the ribs, the ribs projecting radially outwardly adjacent the upper end of the plunger to a radius substantially the same as the radius of the end portion of the plunger whereby the plunger is maintained in substantial coaxial alignment with the tube when the end portion and the outwardly projecting rib portions are positioned in the tube.

12. The apparatus of claim 10 in which the annular plug includes a longitudinally extending generally cylindrical side wall having a radially outwardly extending perimetric rib received in a circumferentially extending groove in the inner surface of the side wall of the end portion whereby the plug is removably secured within the recess.

13. The apparatus of claim 10 in which each of the ribs is provided with a notch above the opening in the top wall of the end portion.

* * * * *